United States Patent [19]
Enomoto et al.

[11] Patent Number: 5,982,407
[45] Date of Patent: *Nov. 9, 1999

[54] COLOR PRINTER

[75] Inventors: Jun Enomoto; Hiroaki Nakamura, both of Kanagawa, Japan

[73] Assignee: Fuji Photo Film Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/763,721

[22] Filed: Dec. 11, 1996

[30] Foreign Application Priority Data

Dec. 13, 1995 [JP] Japan ................................. 7-324657

[51] Int. Cl.⁶ .......................................................... B41J 2/47
[52] U.S. Cl. ............................................ 347/239; 347/252
[58] Field of Search ..................................... 347/239, 238, 347/252, 232

[56] References Cited

U.S. PATENT DOCUMENTS

| | | | |
|---|---|---|---|
| 5,028,939 | 7/1991 | Hornbeck et al. | 347/131 |
| 5,296,958 | 3/1994 | Roddy et al. | 347/232 X |
| 5,337,074 | 8/1994 | Thornton | 347/238 X |
| 5,657,071 | 8/1997 | Shinohara | 347/252 |

OTHER PUBLICATIONS

N. Nishida: "Micro machines and optical techniques (2), Digital micromirror devices (DMD) and their applications to displays", O plus (a magazine), Oct. 1994, No. 179, pp. 90–94.

G. Foley et al.: "S7–6 Recent Advances in Actuated Mirror Array (AMA) Projector Development"; Aura Syss., Inc. El Segundo, USA. Daewoo Elect., Seoul, Korea, 1995.

"Mirrors on a Chip"; IEEE Spectrum, Nov. 1993; pp. 27–31.

"Digital Micromirror Device Imaging Bar for Hardcopy"; Nelson et al.; Digital Imaging Venture Project Texas Instruments Inc., P.O. Box 655474. M/S 440, Dallas, Texas 75265-5474; SPIE vol. 2413; pp. 58–65, Feb. 1995.

"Micromirrors and Digital Processing"; Photonics Spectra; May 1995; pp. 118–124.

*Primary Examiner*—N. Le
*Assistant Examiner*—Lamson D. Nguyen
*Attorney, Agent, or Firm*—Sughrue, Mion, Zinn, Macpeak & Seas, PLLC

[57] ABSTRACT

A color printer is equipped with a digital micromirror device having at least one micromirror array constituted of a number of micromirrors. Each micromirror changes its tilt angle in accordance with a value of mirror drive data of one bit. As the mirror drive data takes a value "1", the micromirror reflects spot light toward color paper, whereas as the mirror drive data takes a value "0", it reflects spot light toward a light absorption plate. During red exposure, red light from a red LED unit is incident upon the digital micromirror device which is then driven by red mirror drive data to expose a red image on the color paper. Next, during radiation of a green LED unit, the digital micromirror device is driven by green mirror drive data to expose a green image on the color paper. Lastly, a blue image is exposed on the color paper by using a blue LED unit. A full-color image is therefore printed on the color paper through three-color line- or frame-sequential exposure.

20 Claims, 7 Drawing Sheets

COLOR PRINTER

BACKGROUND OF THE INVENTION

1. Field of the Invention

The present invention relates to a color printer for recording a color image on photosensitive material, and more particularly to a color printer using a color spatial light modulator having small size mirrors disposed in line or matrix, of each of which the light reflection direction is variable.

2. Description of the Related Art

A color photographic printer for projecting an image of a negative film onto photosensitive material such as color paper is most common as a color printer for recording a color image (including characters and line drawing) on color paper. Recently, a color printer is used in practice which drives a display unit by image data to record a color image on color paper. Such a color printer includes a CRT type, a laser type, a liquid crystal type, and the like.

A CRT type color printer includes a line type and a frame type. The line type uses a flat color CRT drawing red, green, and blue three rasters to form a color image through three-color line-sequential exposure. The frame type uses a fine precision monochrome CRT and a filter turret in which a monochrome image of a three-color image is sequentially formed, and corresponding color filters are set in front of the monochrome CRT to convert the monochrome images into red, green, and blue images and sequentially record them. The CRT type therefore requires a large size CRT and a complicated CRT drive circuit.

A laser color printer uses lasers for generating three-color laser beams and spatial light modulators for modulating the intensity of each laser beam with image data of each color. Intensity modulated laser beams of three colors are synthesized, and the synthesized laser beam is scanned by a polygon mirror or the like in the width direction of color paper to print a color image line-sequentially. With the laser color printer, the intensity of a laser beam is required to be modulated serially in unit of dot so that modulation of one line takes a relatively long time. Furthermore, since an exposure time for one pixel is short, a reciprocity law failure of color paper may occur being unable to reproduce an original image with high fidelity. Still further, a laser color printer cannot perform frame exposure.

A liquid crystal color printer uses as a spatial light modulator a liquid crystal unit having a number of micro light bulbs disposed in line. This liquid crystal color filter has a low transmittance so that a bright light source is necessary, and since it has a low aperture efficiency (vignetting factor), the image quality is degraded. Furthermore, since the performance of a liquid crystal unit changes with time and environments, the tonal level is difficult to be correctly controlled.

A mirror type spatial light modulator is known which has a number of small size mirrors (hereinafter called micromirrors) and the tilt angle of each micromirror is changed to control deflection of spot light. Mirror type spatial light modulators include digital micromirror devices (DMD) which tilt each micromirror by electrostatic force, piezoelectric type drive micromirror devices (AMA) which tilt each micromirror by a fine piezoelectric element, and the like.

For example, a digital micromirror device has a static RAM (SRAM) on each memory cell of which a micromirror capable of swinging is formed by semiconductor integration techniques. Mirror drive data of one bit, when written to each memory cell, tilts the micromirror in a positive direction or in a negative direction to change the light reflection direction. The principle and applications of such a digital micromirror device are described in a monthly magazine "O plus E", October, 1994, pp. 90–94.

The micromirror device has advantages of a low light attenuation coefficient and a large aperture efficiency (vignetting factor). It is therefore advantageous if the micromirror device is utilized in a color printer. In printing a color image by using the monochrome spatial light modulator, a filter turret is used, which is rotated to sequentially enter red, green, and blue sectors into an optical path to perform three-color line-sequential exposure or three-color frame-sequential exposure. This filter turret complicates the structure of a color printer and hinders high speed printing.

SUMMARY OF THE INVENTION

It is a principal object of the present invention to provide a compact color printer simple in structure by dispensing with a filter turret.

In order to achieve the above and other objects, the color printer of this invention comprises spatial light modulator means having at least one micromirror array, a red light source for illuminating during red exposure the spatial light modulator means with red light, a green light source for illuminating during green exposure the spatial light modulator means with green light, and a blue light source for illuminating during blue exposure the spatial light modulator means with blue light, and prints an image on photosensitive material through three-color line- or frame-sequential exposure.

During the red exposure, red light from the red light source is incident upon the spatial light modulator means which is driven in accordance with red image data to control a tilt of each micromirror and to project the red light reflected from the spatial light modulator means upon the photosensitive material. During the green exposure, the green light source is turned on and the spatial light modulator means is driven in accordance with green image data. During the blue exposure, the blue light source is turned on and the spatial light modulator means is driven in accordance with blue image data.

According to a preferred embodiment of the invention, the spatial light modulator means includes N (N is an optional natural number) micromirror arrays, and the micromirrors are disposed in matrix. According to another embodiment of the invention, the color printer further comprises a white light source for illuminating the spatial light modulator means with white light to record a monochrome image (including monochrome characters).

According to the present invention, a color image is printed by three-color line- or frame-sequential exposure by using a mirror type spatial light modulator means, so that a high quality color image can be printed. Furthermore, since a filter turret is not necessary, the structure becomes simple and compact more than a conventional color printer. In addition to three-color light sources, a white light source for illuminating the spatial light modulator means with white color is provided so that a monochrome image as well as a full-color image can be printed.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENTS

Figure 1:
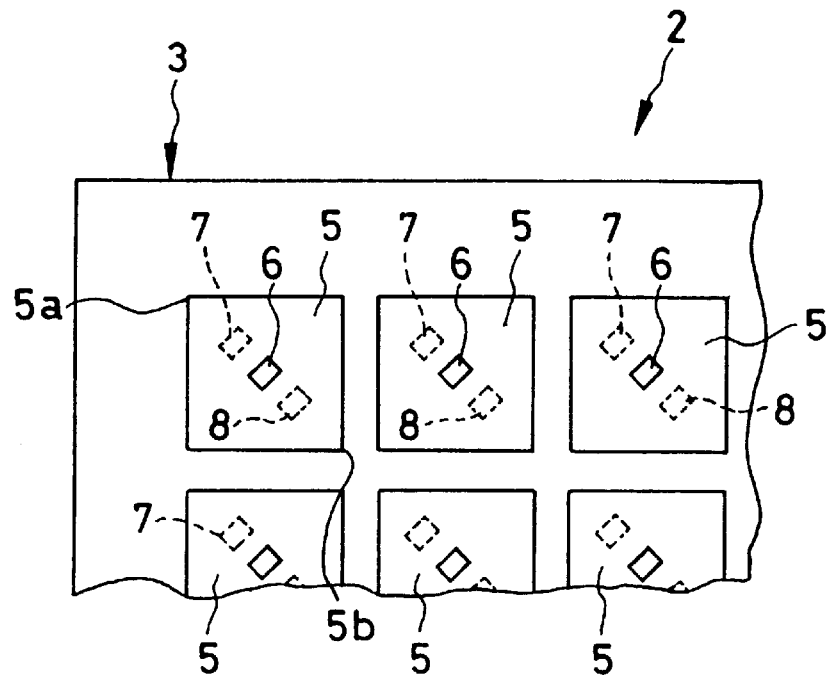
FIG. 1 is a diagram illustrating a digital micromirror device constituting a main part of this invention.

FIG. 1 shows a digital micromirror device 2 used as a spatial light modulator. The digital micromirror device 2 has a static RAM (SRAM) 3 and a plurality of micromirrors 5 formed above SRAM 3 in line. Each micromirror 5 is supported for being capable of swinging above SRAM 3 at a post 6 formed at the central area of the memory cell. Each micromirror 5 is a square having a side length of, for example, 16 µm, and is made of a metal thin film such as conductive aluminum.

Address electrodes 7 and 8 are formed on both sides of the post 6. The address electrodes 7 and 8 and the micromirror 5 constitute a capacitor. The micromirror 5 is tilted by static electricity charged between the address electrodes 7 and 8 and the micromirror 5. Specifically, one of the corners 5a and 5b on a diagonal line passing through the post 6 and address electrodes 7 and 8 tilts and contacts the silicon substrate on which SRAM 3 is formed. The corners on the other diagonal line are suspended by a pair of support posts via torsion hinges. Each constituent such as micromirror 5 and post 6 is fabricated by known transistor integration techniques.

Figures 2A, 2B, 2C:
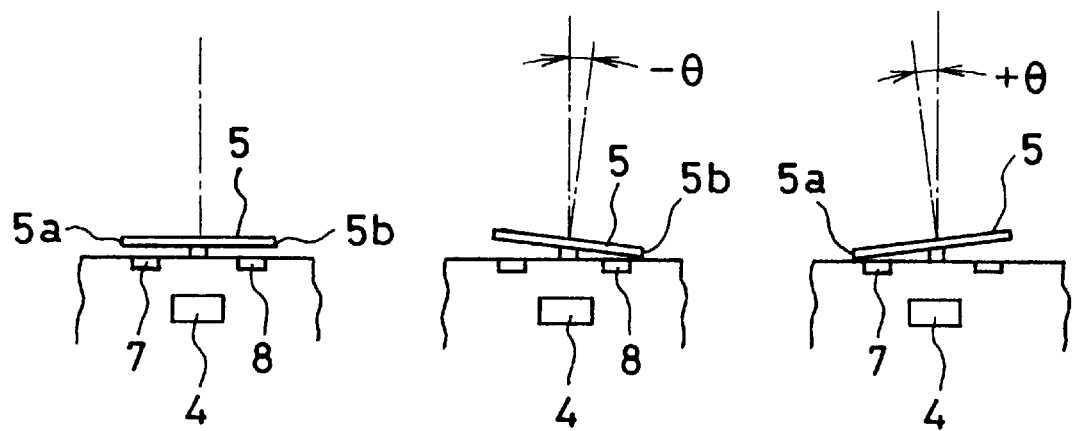
FIGS. 2A to 2C are diagrams illustrating the operation of a micromirror.

As shown in FIGS. 2A to 2C, each micromirror 5 is disposed above each memory cell 4 of SRAM 3. Each memory cell 4 is constituted of a flip-flop having at least two transistors. The transistors are connected to the address electrodes 7 and 8. One transistor of the flip-flop in an active state is ON and the other is OFF. Therefore, one of the address electrodes is, for example, +5 V and the other is 0 V. The mirror drive data determines the electrode at +5 V.

If the power is OFF, the two transistors are OFF so that the address electrodes 7 and 8 do not receive application of any voltage and the micromirror does not receive application of a bias voltage. Therefore, the micromirror 5 is horizontal as shown in FIG. 2A.

As mirror drive data "0" is written to the memory cell 4, the address electrode 7 has 0 V and the address electrode 8 has +5 V. As a negative bias is applied to the micromirror 5, the micromirror 5 tilts to the address electrode 8 side and its corner 5b contacts the silicon substrate, as shown in FIG. 2B.

As mirror drive data "1" is written to the memory cell 4, the address electrode 7 has +5 V and the address electrode 8 has 0 V. As a negative bias is applied to the micromirror 5, the micromirror 5 tilts to the address electrode 7 side and its corner 5a contacts the silicon substrate, as shown in FIG. 2C. The micromirror 5 tilts therefore by +θ or by −θ in accordance with the mirror drive data value.

The micromirror 5 has one horizontal state and two tilt states. The two tilt states are utilized for image formation. In one of the two tilt states, spot light travels from the micromirror 5 to form an image. For example, while the micromirror 5 takes +θ, spot light from the micromirror 5 is guided to an image forming optical path. While the micromirror 5 takes −θ, spot light is not needed so that it is guided to an eliminating optical path. While the micromirror 5 takes +θ, a valid reflection state (ON state) maintains in which reflection light is utilized for image formation. While the micromirror 5 takes −θ, an invalid reflection state (OFF state) maintains in which reflection light is not utilized for image formation. The tonal level of an image can be represented by changing the time or occurrence frequency of the valid reflection state of the micromirror 5.

Figure 3:
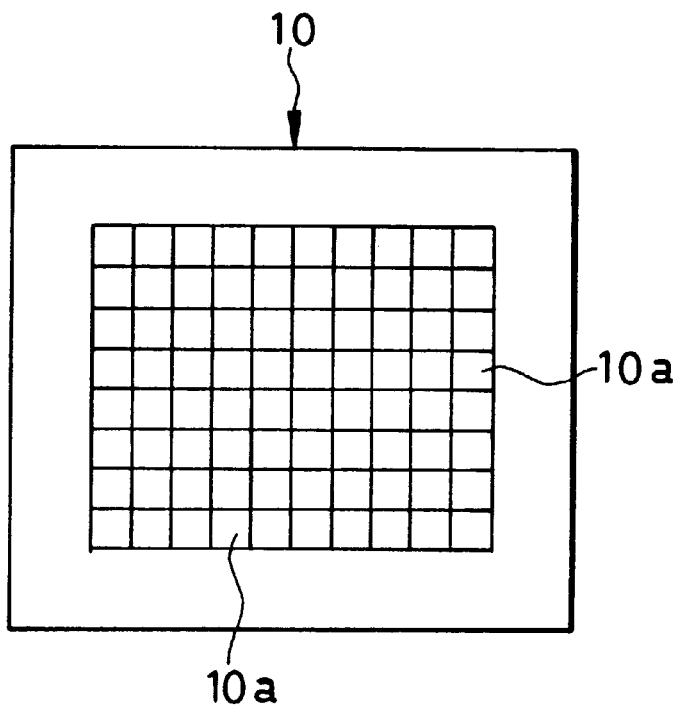
FIG. 3 is an illustrative plan view showing an example of a digital micromirror device.

FIG. 3 shows a digital micromirror device used for frame exposure. Micro mirror arrays each having a number of micromirrors 10a disposed in line are juxtaposed. Each micromirror array has 10 micromirrors in the drawing, but has a great number thereof actually. In this embodiment, micromirror arrays of nine columns are provided and the micromirrors 10a are disposed in matrix. As shown in FIG. 1, a small space is formed between adjacent two micromirrors on the same column, and the same space is formed between two micromirror arrays. For simplicity of the drawing, the micromirrors 10a in FIG. 3 are shown in contact with each other.

Figure 4:
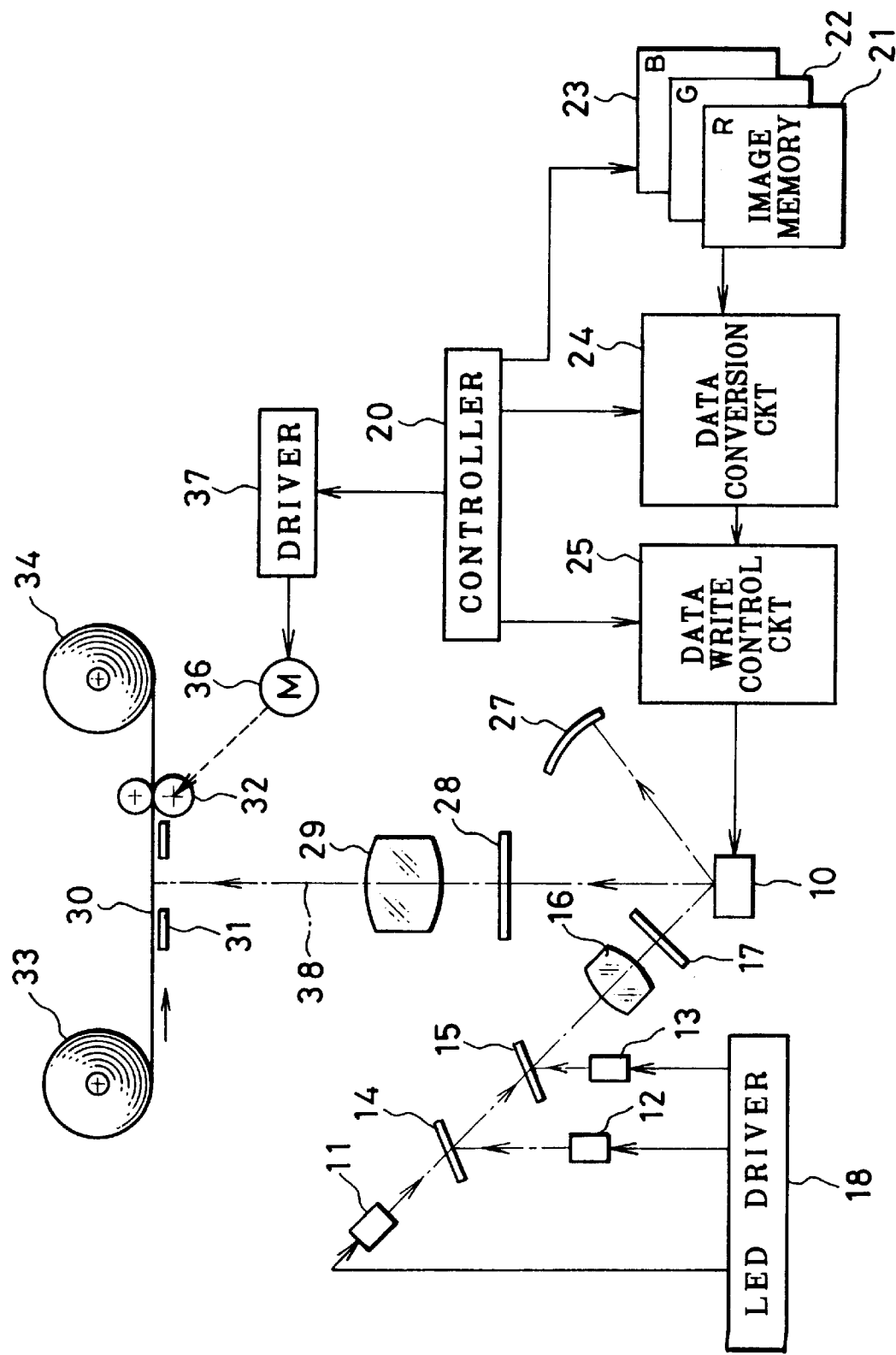
FIG. 4 is a schematic diagram of a color printer of this invention using a digital micromirror device.

Referring to FIG. 4 showing the color printer of this invention, provided as the light sources for illuminating the digital micromirror device 10 are a red LED unit 11 for frame radiation having a number of red LEDs formed on a substrate in matrix, a green LED unit 12, and a blue LED unit 13 respectively of a similar structure.

Red light from the red LED unit 11 transmits through a dichroic mirror 14 reflecting green light and a dichroic mirror 15 reflecting blue light. This red light is condensed by a condenser lens 16 and illuminates the whole surface of the digital micromirror device 10. Green light from the green LED unit 12 is reflected by the dichroic mirror 14, transmits through the dichroic mirror 15, and illuminates the whole surface of the digital micromirror device 10. Blue light from the blue LED unit 13 is reflected by the dichroic mirror 15, and illuminates the whole surface of the digital micromirror device 10. A balance filter 17 performs shading correction.

An LED driver 18 is controlled by a controller 20 to activate only the red LED unit 11 during red exposure, to activate only the green LED unit 12 during green exposure, and to activate only the blue LED unit 13 during blue exposure. These LED units 11 to 13 are excellent in the response characteristics of light radiation and have a predetermined illuminance in a short time. If the response characteristics are not important, three lamps may be used by disposing color filters in front of the three lamps.

Red, green, and blue image memories 21, 22, and 23 store three-color image data of one frame. Image memory for each color is read for exposure. For example, for red exposure, image data is read from the red image memory 21 and sent to a data converter circuit 24, at which the red image data is converted into mirror drive data.

In this embodiment, the data converter circuit 24 sequentially fetches each image data set, starting from the highest bits, and sends them as the mirror drive data to a data write control circuit 25. The data write control circuit 25 writes the mirror drive data into SRAM of the digital micromirror device 10 synchronously with a write timing signal.

As the micromirror 10a tilts by −θ in response to the mirror drive data "0", it enters the invalid reflection state and its reflection light is incident upon the light absorbing plate 27. As the micromirror 10a tilts by +θ in response to the mirror drive data "1", it enters the valid reflection state and spot reflection light is incident upon a projector lens 29 via a balance filter 28.

Spot light of one frame reflected from the digital micromirror device 10 is projected by the projector lens onto photosensitive material such as color paper 30 to record an image of one frame. An image whose color and density are an inversion of an image to be recorded on the color paper 30 is incident upon the color absorption plate 27. Therefore, if color photosensitive material is disposed at the position of the light absorption plate 27 and a projector lens is disposed in front of the color photosensitive material, then an image whose color and density are an inversion of an image to be recorded on the color paper 30 can be formed. Reference numeral 31 represents a mask.

The color paper 30 is nipped with a transport roller pair 32, intermittently pulled out of a supply roll 33 by one frame, and sent to a take-up roll 34. While the color paper 30 is stopped, three-color images are recorded frame sequentially. A pulse motor 36 for rotating the transport roller pair 32 is controlled by a controller 20 via a driver 37.

Figure 5:
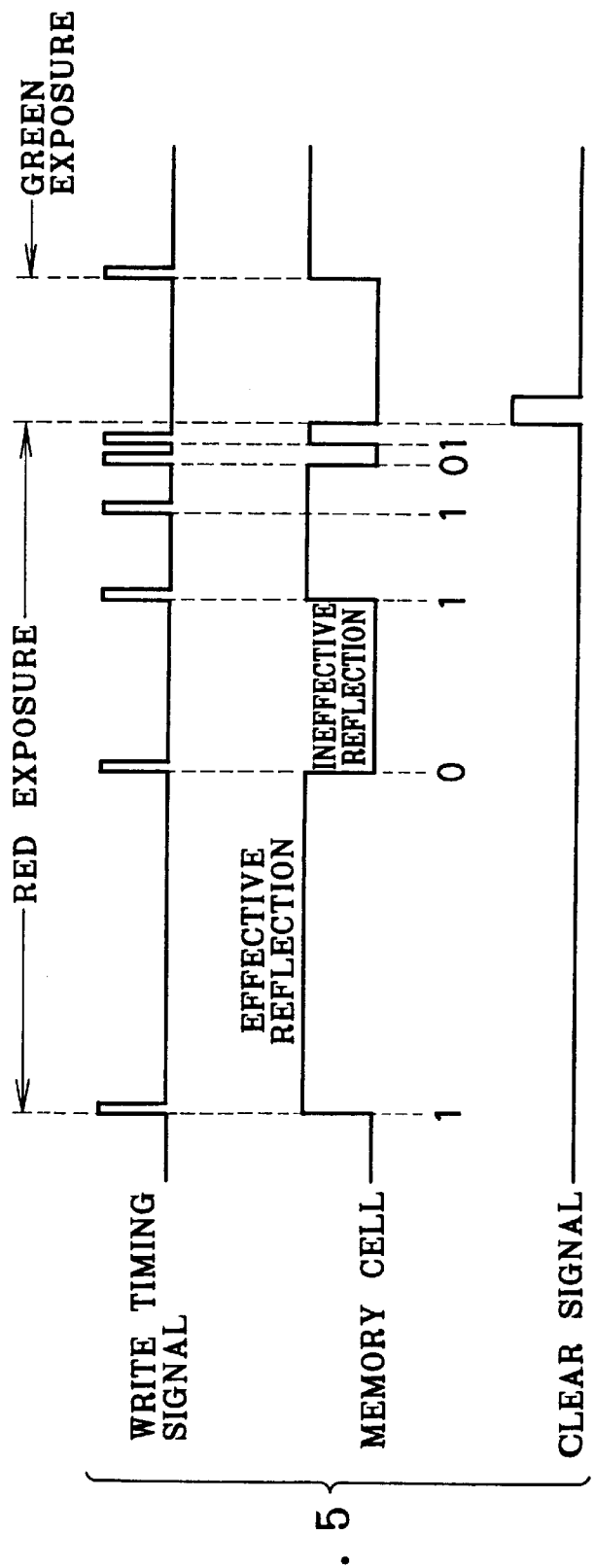
FIG. 5 shows signal waveforms illustrating red exposure.

FIG. 5 shows waveforms illustrating a print operation of a red image. The mirror drive data is sequentially formed by the image data set starting from the highest bit. In this example, the mirror drive data is "101101". This mirror drive data is written into SRAM by six write operations in synchronism with six write timing signals. Since the occurrence period of write timing signals is sequentially reduced to a half of an occurrence period preceding thereto, the image data is pulse-width modulated.

After the red exposure, the data write control circuit 25 writes "0s" into SRAM to clear it. Thereafter, green and blue exposures are sequentially performed to print a color image on the color paper 30 frame-sequentially.

Next, the operation of the color printer constructed as above will be described. Upon instruction of printing, the controller 20 instructs the data write control circuit 25 to clear the digital micromirror device 10. The data write control circuit 25 writes mirror drive data "0" into SRAM of the digital micromirror device 10 to tilt each micromirror 10a by −θ and causes it to have the invalid reflection state as shown in FIG. 2B.

Next, the controller 20 causes the LED driver 18 to activate the red LED unit 11 and illuminate the whole surface of the digital micromirror device 10. In this case, since "0" has been stored in each memory cell of SRAM, each micromirror 10a has the invalid reflection state. Therefore, red spot light reflected from each micromirror 10 is guided toward the light absorption plate 27.

The controller 20 reads red image data of one frame from the red image memory 21 and sends it to the data converter circuit 24. This data converter circuit 24 picks up the highest bits of respective image data sets of one frame as the mirror drive data, and sends it as a parallel signal to the data write control circuit 25. Synchronously with the first write timing signal, the mirror drive data of one frame is written to SRAM of the digital micromirror device 10.

The micromirror 10a enters the valid reflection state when the mirror drive data "1" is supplied, and reflects the incident red spot light along a print optical axis 38. This red spot light is projected onto the color paper 30 by the projector lens 29. In this manner, red spot light of one frame becomes incident upon the color paper 30 to complete the first exposure. The micromirror 10a applied with the mirror drive data "0" enters the invalid reflection state so that the reflected red spot light is incident upon the light absorption plate 27.

Next, the data converter circuit 24 picks up the second highest bits of respective red image data sets, and sends them as the mirror drive data to the data write control circuit 25. Synchronously with the second write timing signal, the data write control circuit 25 writes the mirror drive data of one frame into the digital micromirror device 10. This write operation performs the second exposure by using spot light from the micromirrors in the valid reflection state.

In this manner, each micromirror performs exposure six times at a maximum in accordance with six-bit mirror drive data. The lower the bit of the mirror drive data, the shorter an exposure time at each stage. As shown in FIG. 5, if the mirror drive data is "101101", exposure is performed four times.

After the red exposure, the data write control circuit 25 writes mirror drive data of "0" into SRAM to clear it. Immediately thereafter, the controller 20 reads green image data of one frame from the green image memory 22 and sends it to the data converter circuit 24.

The data converter circuit 24 picks up as the mirror drive data the highest bits of the green image data of one frame and writes them to the digital micromirror device 10 in response to the first write timing signal. Each micromirror 10a changes its tilt in accordance with the mirror drive data and reflects the green spot light toward the color paper 30. Similar to the red exposure, six exposures of green light are carried out so that each micromirror 10a supplies an exposure amount corresponding to the green image data to the color paper 30.

After the green exposure, a blue image is printed on the color paper 30 in accordance with blue image data. With this three-color frame-sequential exposure, a full-color image is printed on the color paper 30. After this printing, the controller 20 instructs the driver 37 to rotate the pulse motor 36 to transport the color paper 30 by one frame in a direction indicated by an arrow.

If positive-positive type color paper is used, the color spatial light modulator 10 is driven by using image data of a positive image. If general negative-positive type color paper is used, a negative image is projected by using image data of a negative image.

Figure 6:
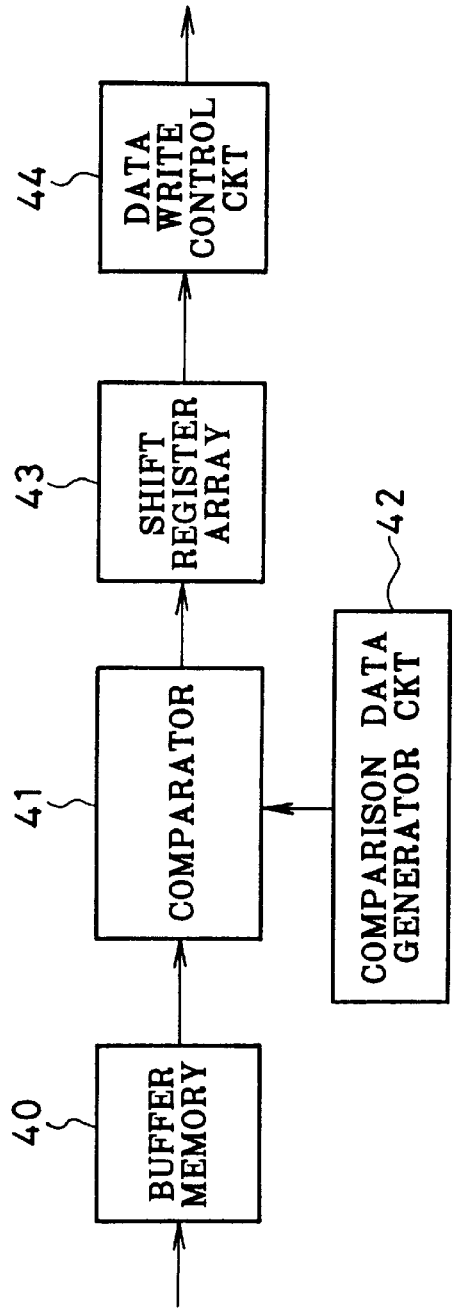
FIG. 6 is a block diagram showing an example of a data converter circuit using a comparator.

FIG. 6 shows another embodiment of a data converter circuit. Image data read from the image memory is temporarily stored in a buffer memory 40. Next, each pixel of the image data is picked up from the buffer memory 40 and sent to a comparator 41. The comparator 41 compares comparison data supplied from a comparison data generator circuit 42 with each set of image data to convert the image data into mirror drive data. For example, if the comparison data is smaller than the image data, the image data is converted into mirror drive data "0", whereas if the comparison data is equal to or larger than the image data, the image data is converted into mirror drive data "1".

If the image data has six bits, the comparison data generator circuit 42 generates comparison data of "1" to "64" in decimal notation. The comparison data generator circuit 42 first generates comparison data "1" and sends it to the comparator 41. The comparator 41 sequentially fetches image data of one frame one pixel after another, and compares it with the comparison data "1" to convert the image data into the mirror drive data of one frame.

After the first comparison of image data of one frame, the comparison data generator circuit 42 generates comparison data "2". The comparator 41 compares the image data of one frame with the comparison data "2". Similarly, comparison with the comparison data "3" to "64" is performed. In this manner, the six-bit image data is compared 64 times and converted into mirror drive data of 64 items.

Figure 7:
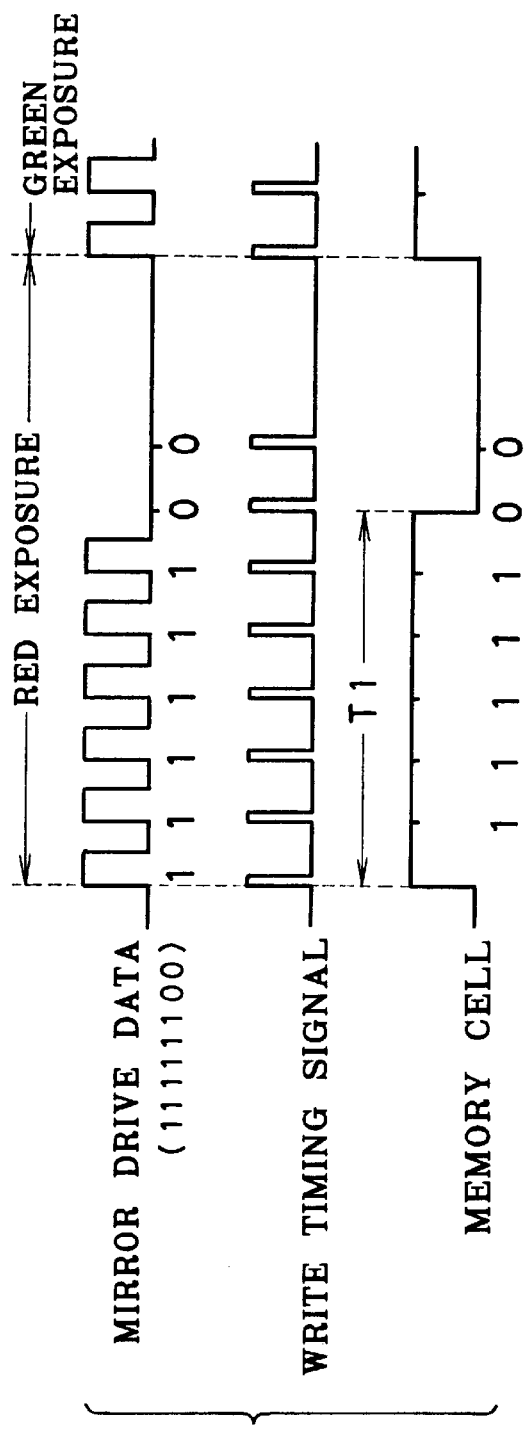
FIG. 7 shows signal waveforms illustrating an operation of the data converter circuit shown in FIG. 6.

In FIG. 7, mirror drive data of 8 bits is illustratively shown. The 8-bit mirror drive data output from the comparator 41 is sent to a shift register array 43 which is constituted of a plurality of shift registers corresponding in number to that of micromirrors. Each shift register sequentially sends one bit of the mirror drive data to the data write control circuit 25 to write it into a memory cell in response to each write timing signal. In this example, the mirror drive data is "11111100" so that the micro mirror has the valid reflection state during a time period of T1. This time period T1 is an exposure time and depends upon the magnitude of an image data value so that a half tone representation matching the image data is possible. The write timing signals have a constant period.

Figure 8:
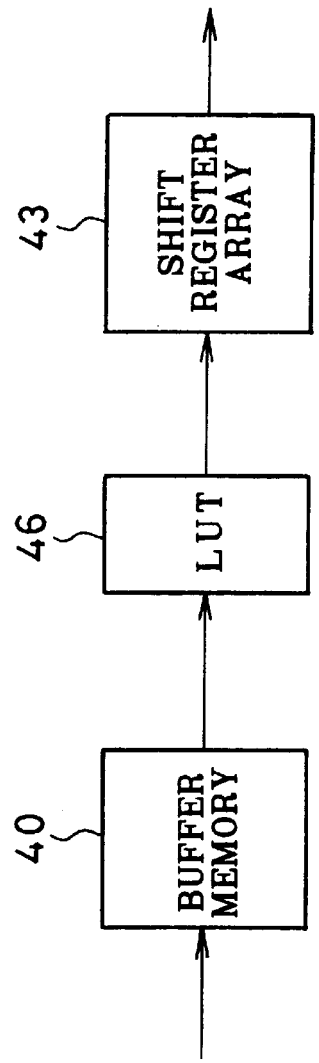
FIG. 8 is a block diagram showing an example of a data converter circuit using an LUT.
Figure 9:
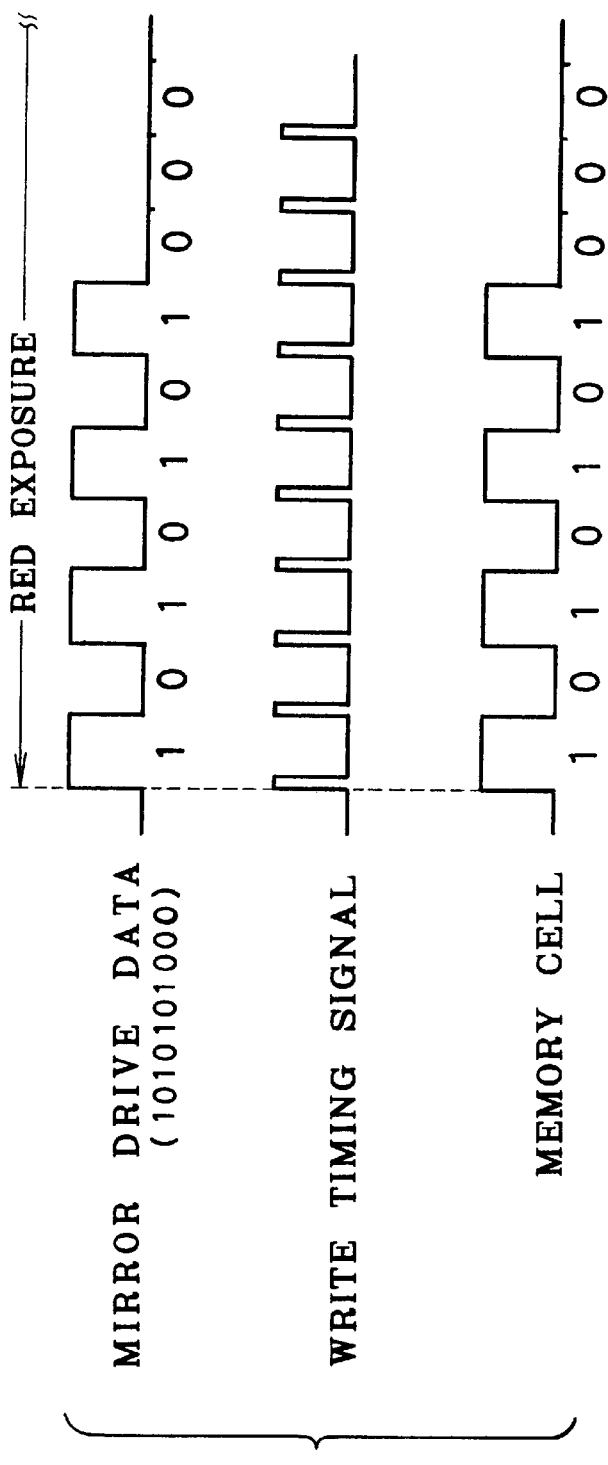
FIG. 9 shows signal waveforms illustrating an operation of the data converter circuit shown in FIG. 8.

A data converter circuit shown in FIG. 8 uses a LUT (look-up table) memory. An LUT 46 stores table data representative of a relationship between each image data and corresponding mirror drive data. By using the image data as an address, mirror drive data is read from LUT 80 and set to the shift register array 43. In the example shown in FIG. 9, the mirror drive data is "1010101000" so that four exposure operations are executed for recording one pixel.

Figure 10:
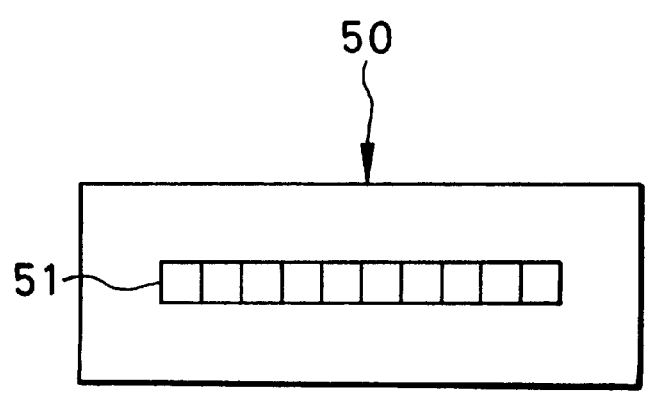
FIG. 10 is an illustrative view showing a digital micromirror device using a micromirror array of one column.

FIG. 10 shows a digital micromirror device used for line printing. The digital micromirror device 50 has a micromirror array of one column. The micromirror array actually has a great number of micromirrors 51. While color paper is not transported, a red LED unit having a number of light emitting diodes disposed in line is driven and the red light becomes incident upon the digital micromirror device 50. In accordance with red image data of one line, the digital micromirror device 50 reflects red line light. This red line light records one line on color paper.

Next, green light from a green LED unit is made incident upon the digital micromirror device 50 which reflects green line light to record one line on the color paper. Lastly, blue light from a blue LED unit is made incident upon the digital micromirror device 50 which reflects blue line light. After the three-color line exposure, the color paper is transported by one record line to again perform three-color line-sequential exposure.

Figure 11:
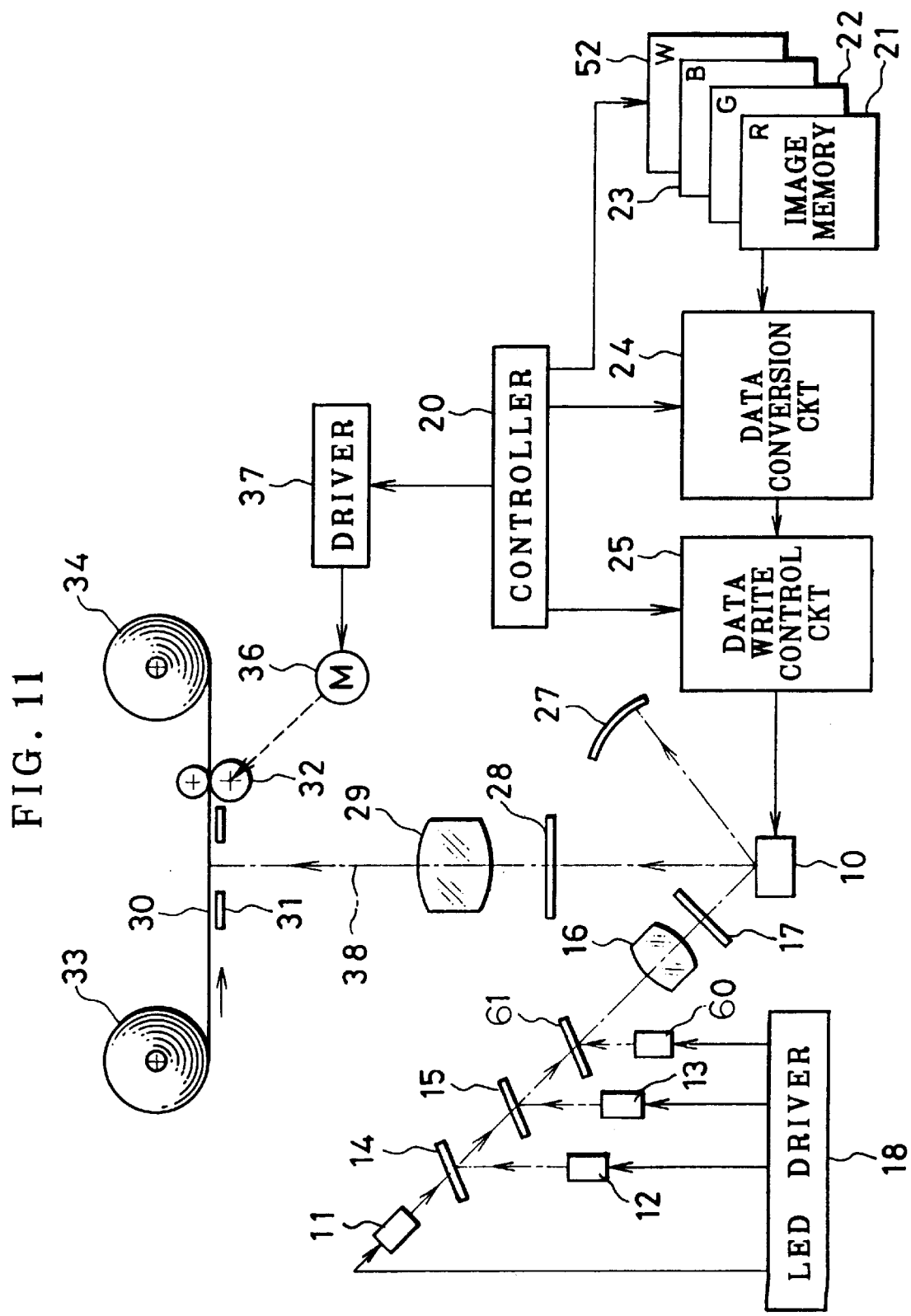
FIG. 11 is a schematic diagram showing a color printer capable of printing both a monochrome image and a color image.

On a postcard or the like, characters indicating compliments, a notice, an address, or the like are often printed together with a color image. FIG. 11 shows a color printer capable of printing a monochrome image such as characters, phrases, signs, and other literal or symbolic images. A white light source 60 for radiating white light having a proper grey balance with color paper 30 is provided. This white light illuminates via a half mirror 61 a digital micromirror device 10, which has numerous micromirrors for one frame. The line print type digital micromirror device 50 shown in FIG. 10 may be used.

If a hard copy is intended to have only a monochrome image such as characters, only the white light source 60 is turned on to illuminate the digital micromirror device 10, which is then driven by monochrome image data read from a monochrome image memory 52. If a hard copy is intended to have a mixture of characters and color images, the red LED unit 11, the green LED unit 12, the blue LED unit 13, and the white light source 60 are sequentially turned on to print images through four-color frame-sequential exposure.

A color printer of this invention may directly print image data fetched from a scanner, a video reproducing apparatus, or the like, or may print it after image processing. For example, sequentially input images may be printed one at each time succeeding the inputting, or image data may be thinned to form a synthesized image of reduced images disposed in matrix which may be then printed on color paper as an index sheet. It is also possible that the same image data is input to two color printers to form an image one at a time by one color printer and to form an index sheet through image synthesis by the other color printer.

A color printer of this invention may be combined with a conventional photographic printer which projects an image of a photographic film onto color paper to print it. For example, an integrated assembly of a conventional photographic printer as a first printer and a color printer of this invention as a second printer may be used. The color printer and photographic printer may be used in combination in operations.

With an integrated assembly, two printers may use the same exposure stage or different exposure stages. Two printers may use the same photosensitive material or different photosensitive materials. If the same exposure stage is used and the two printers use different photosensitive materials, the photosensitive materials accommodated in two magazines are selectively fed to the exposure stage. In this case, components other than the paper feeder can be used in common so that the apparatus can be made compact.

If the same exposure stage is used by the first and second printers, a photographic image of the first printer and a character or illustration image by the second printer may be printed superposed one upon the other in the same frame to thereby form, for example, a postcard. The first printer may be provided with a scanner which reads each frame of a photographic print to form an index image. After one roll of photographic film is printed, the index sheet may be formed by the second printer. In this case, a print of a photographic film and an index sheet may be formed by using the same photosensitive material or different photosensitive materials.

If the different exposure stages are used by the first and second printers, different images may be printed in the same frame to thereby form, e.g., a postcard. If images are printed in different frames of the same photosensitive material, the first printer may be provided with a scanner. In this case, if the image can be printed without any correction, the first printer prints it. For a frame which requires image processing such as dodging (shutting light method), the second printer prints it.

If both the exposure stage and photosensitive material are different, the first printer prints a photographic film and each frame thereof is read with a scanner to form an index image, which is printed by the second printer using the different photosensitive material.

A color printer of this invention and a photographic printer may be used discretely. In this case, the photographic printer exposes and prints an image of a photographic film, a scanner in the photographic printer reads each frame of the photographic film, and the obtained video signals are sent via wires, radio waves, or storage devices, to the color printer of this invention to form an index print.

Although the digital micromirror device has been described as a spatial light modulator, the color printer of this invention may use a piezoelectric drive type micromirror device, in which each micromirror is tilted by a fine piezoelectric element.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A color printer for printing an image on photosensitive material, comprising:

means for modulating the intensity of a laser beam with image data of one color, said modulator means having at least one micromirror array having a plurality of micromirrors disposed in line, wherein each of said micromirrors includes a first tilt state, a second tilt state and a horizontal state;

means for driving said modulator means to control a tilt of each of said micromirrors, said driver means driving during red exposure said modulator means in accordance with red image data to control a tilt of each micromirror, said driver means driving during green exposure said modulator means in accordance with green image data to control a tilt of each micromirror, and said driver means driving during blue exposure said modulator means in accordance with blue image data to control a tilt of each micromirror;

a red light source for striking said modulator means at a predetermined angle of incidence and illuminating said modulator means with red color light during the red exposure, said red light being disposed on a first line corresponding to said predetermined angle of incidence;

a green light source disposed downstream from said red light source along said first line corresponding to said predetermined angle of incidence for striking said modulator means at said predetermined angle of incidence and illuminating said modulator means with green color light during the green exposure;

a blue light source disposed downstream from said green light source along said first line corresponding to said predetermined angle of incidence for striking said modulator means at said predetermined angle of incidence and illuminating said modulator means with blue color light during the blue exposure; and a projector optical system disposed in a second line corresponding to a first predetermined angle of reflection from said modulator means, for projecting red, green, and blue color light reflected from micromirrors of said modulator means which are disposed in said first tilt state onto the photosensitive material.

2. A color printer according to claim 1, wherein said modulator means includes N micromirror arrays, wherein N is a natural number, the micromirrors being disposed in a matrix.

3. A color printer according to claim 2, wherein said red light source is a red LED unit, said green light source is a green LED unit, and said blue light source is a blue LED unit.

4. A color printer according to claim 3, wherein each of the plurality of micromirror arrays takes at least one of a valid reflection state, wherein the micromirrors are disposed in said first tilt state, and an invalid reflection state, wherein the micromirrors are disposed in said second tilt state, based on micromirror drive data from said driver means, said valid reflection state being along said second line corresponding to said first predetermined angle of reflection from said modulator means, along which said red, green, and blue light are reflected toward the photosensitive material; and said invalid reflection state being along a third line corresponding to a second predetermined angle of reflection from said modulator means, along which said red, green, and blue light are reflected toward a light absorption material.

5. A color printer according to claim 4, wherein said driver means frequency-modulates image data of each color and adjusts a total time of having the valid reflection state in accordance with the image data.

6. A color printer according to claim 5, further comprising a white light source disposed downstream from said blue light source along said first line corresponding to said predetermined angle of incidence for striking said modulator means at said predetermined angle of incidence and illuminating said modulator means with white light to record a monochrome image.

7. A color printer for printing an image on photosensitive material, comprising:

means for modulating the intensity of a laser beam with image data of one color, said modulator means having at least one micromirror array having a plurality of micromirrors disposed in line each capable of being controlled to tilt;

means for driving said modulator means to control a tilt of each of said micromirrors, said driver means driving during red exposure said modulator means in accordance with red image data to control a tilt of each micromirror, said driver means driving during green exposure said modulator means in accordance with green image data to control a tilt of each micromirror, and said driver means driving during blue exposure said modulator means in accordance with blue image data to control a tilt of each micromirror;

a red light source for striking said modulator means at a predetermined angle of incidence and illuminating said modulator means with red color light during the red exposure, said red light being disposed on a first line corresponding to said predetermined angle of incidence;

a green light source disposed downstream from said red light source along said first line corresponding to said predetermined angle of incidence for striking said modulator means at said predetermined angle of incidence and illuminating said modulator means with green color light during the green exposure;

a blue light source disposed downstream from said green light source along said first line corresponding to said predetermined angle of incidence for striking said modulator means at said predetermined angle of incidence and illuminating said modulator means with blue color light during the blue exposure; and a projector optical system disposed in a second line corresponding to a first predetermined angle of reflection from said modulator means, for projecting red, green, and blue color light reflected from said modulator means onto the photosensitive material; and a white light source disposed downstream from said blue light source along said first line corresponding to said predetermined angle of incidence for striking said modulator means at said predetermined angle of incidence and illuminating said modulator means with white light to record a monochrome image.

8. A color printer according to claim 7, wherein said red light source is a red LED unit, said green light source is a green LED unit, and said blue light source is a blue LED unit.

9. A color printer according to claim 7, wherein said modulator means includes N micromirror arrays, wherein N is a natural number, the micromirrors being disposed in a matrix.

10. A color printer according to claim 9, wherein each of the micromirror arrays takes at least one of a valid reflection state and an invalid reflection state based on micromirror drive data from said driver means, said valid reflection state being along said second line corresponding to said first predetermined angle of reflection from said modulator means, along which said red, green, and blue light are reflected toward the photosensitive material; and said invalid reflection state being along a third line corresponding to a second predetermined angle of reflection from said modulator means, along which said red, green, and blue light are reflected toward a light absorption material.

11. A color printer according to claim 10, wherein said driver means frequency-modulates image data of each color and adjusts a total time of having the valid reflection state in accordance with the image data.

12. A color printer for printing an image on photosensitive material, comprising:

a modulator which modulates the intensity of a laser beam with image data of one color, said modulator including at least one micromirror array having a plurality of micromirrors, wherein each of said micromirrors includes a first tilt state, a second tilt state and a horizontal state;

a driver which drives said modulator to control a tilt state of each of said micromirrors, said driver driving during red exposure said modulator in accordance with red image data to control a tilt state of each micromirror, said driver driving during green exposure said modulator in accordance with green image data to control a tilt state of each micromirror, and said driver driving during blue exposure said modulator in accordance with blue image data to control a tilt state of each micromirror.

13. A color printer according to claim 12, further comprising:

a red light source which strikes said modulator at a predetermined angle of incidence and illuminates said modulator with red color light during the red exposure, said red light being disposed on a first line corresponding to said predetermined angle of incidence;

a green light source, disposed downstream from said red light source along said first line corresponding to said predetermined angle of incidence, which strikes said modulator at said predetermined angle of incidence and illuminates said modulator with green color light during the green exposure;

a blue light source, disposed downstream from said green light source along said first line corresponding to said predetermined angle of incidence, which strikes said modulator at said predetermined angle of incidence and illuminates said modulator with blue color light during the blue exposure; and a projector optical system disposed in a second line corresponding to a first predetermined angle of reflection from said modulator, which projects red, green, and blue color light reflected from micromirrors of said modulator which are disposed in said first tilt state onto the photosensitive material.

14. A color printer according to claim 13, wherein said red light source is a red LED unit, said green light source is a green LED unit, and said blue light source is a blue LED unit.

15. A color printer according to claim 13, wherein said modulator includes N micromirror arrays, wherein N is a natural number, the micromirrors being disposed in a matrix.

16. A color printer according to claim 15, wherein each of the plurality of micromirror arrays takes at least one of a valid reflection state, wherein the micromirrors are disposed in said first tilt state, and an invalid reflection state, wherein the micromirrors are disposed in said second tilt state, according to micromirror drive data from said driver.

17. A color printer according to claim 16, wherein said valid reflection state is along said second line corresponding to said first predetermined angle of reflection from said modulator, along which said red, green, and blue light are reflected toward the photosensitive material.

18. A color printer according to claim 17, wherein said invalid reflection state is along a third line corresponding to a second predetermined angle of reflection from said modulator, along which said red, green, and blue light are reflected toward a light absorption material.

19. A color printer according to claim 16, wherein said driver frequency-modulates image data of each color and adjusts a total time of having the valid reflection state in accordance with the image data.

20. A color printer according to claim 13, further comprising a white light source, disposed downstream from said blue light source along said first line corresponding to said predetermined angle of incidence, which strikes said modulator at said predetermined angle of incidence and illuminates said modulator with white light to record a monochrome image.

* * * * *